United States Patent
Williams et al.

(10) Patent No.: US 7,510,327 B2
(45) Date of Patent: Mar. 31, 2009

(54) HIGH STRENGTH RIBBON-WOVEN DISPOSABLE BAG FOR CONTAINING REFUSE

(75) Inventors: Bruce A. Williams, South Boston, MA (US); Bruno Goncalves Drummond, Cambridge, MA (US)

(73) Assignee: Global Strategies, Inc., Boston, MA (US)

( * ) Notice: Subject to any disclaimer, the term of this patent is extended or adjusted under 35 U.S.C. 154(b) by 572 days.

(21) Appl. No.: 11/079,060

(22) Filed: Mar. 14, 2005

(65) Prior Publication Data

US 2006/0204696 A1  Sep. 14, 2006

(51) Int. Cl.
*B65D 30/04* (2006.01)
*B65D 30/14* (2006.01)
*B65D 30/08* (2006.01)

(52) U.S. Cl. .................. 383/117; 383/113; 383/116

(58) Field of Classification Search ............. 383/117, 383/113, 116
See application file for complete search history.

(56) References Cited

U.S. PATENT DOCUMENTS

| | | | | |
|---|---|---|---|---|
| 3,054,406 A | * | 9/1962 | Usher | 606/151 |
| 3,439,865 A | * | 4/1969 | Port et al. | 383/117 |
| 3,445,055 A | * | 5/1969 | Port et al. | 383/32 |
| 3,503,106 A | * | 3/1970 | Port et al. | 264/103 |
| 3,698,980 A | * | 10/1972 | Addison, Jr. | 156/282 |
| 4,010,784 A | * | 3/1977 | Nattrass et al. | 383/17 |
| 4,239,831 A | * | 12/1980 | Pattenden | 428/193 |
| 4,373,979 A | * | 2/1983 | Planeta | 156/73.1 |
| 4,505,201 A | * | 3/1985 | Abele | 102/324 |
| 4,643,119 A | * | 2/1987 | Langston et al. | 112/421 |
| 5,108,196 A | * | 4/1992 | Hughes | 383/17 |
| 5,251,761 A | * | 10/1993 | Hansen et al. | 209/3.3 |
| 5,395,665 A | * | 3/1995 | Planeta | 428/36.1 |
| 5,518,314 A | * | 5/1996 | Kawafuchi et al. | 383/22 |
| 5,615,979 A | * | 4/1997 | Lin | 405/289 |
| 5,709,477 A | * | 1/1998 | Schinasi et al. | 383/4 |
| 6,056,440 A | * | 5/2000 | Nattrass | 383/109 |

* cited by examiner

*Primary Examiner*—Jes F Pascua
(74) *Attorney, Agent, or Firm*—Robert K. Tendler

(57) ABSTRACT

An ultra-strong tear resistant, cut resistant, puncture resistant bag having a high shear strength or modulus is provided by weaving ribbons of flat polypropylene sheet into a bag. The bag is formed by weaving a cylindrically shaped object, cutting the object transversely and sealing up one end to form the bag. The physical properties of the ribbon-woven bag easily accommodate holding refuse including bricks, wood with nails, glass and other refuse in a lightweight disposable bag. In an alternative embodiment, the ribbon-woven bag is overlain with sheets laminated to the exterior of the bag to provide a fluid-tight container.

20 Claims, 5 Drawing Sheets

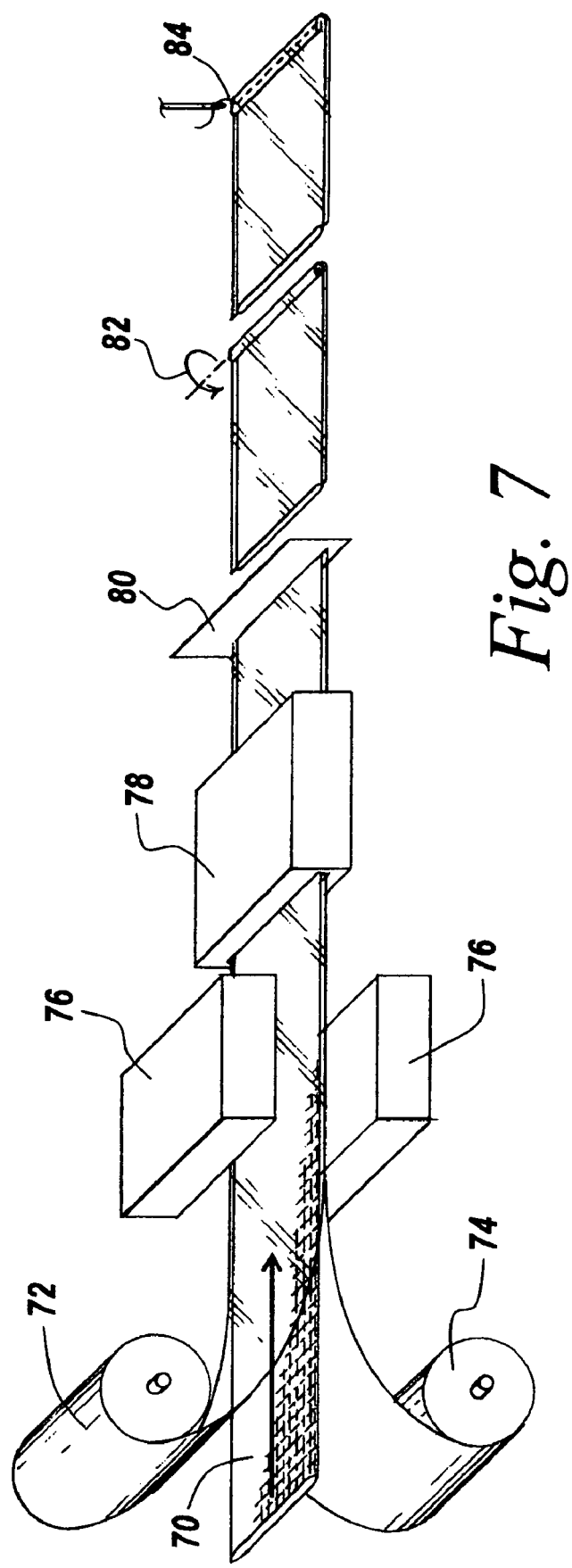

HIGH STRENGTH RIBBON-WOVEN DISPOSABLE BAG FOR CONTAINING REFUSE

FIELD OF THE INVENTION

This invention relates to disposable bags and more particularly to a polypropylene ribbon-woven bag of sufficient strength to contain heavy refuse having pointed or sharp edges without rupture, tearing or disintegration.

BACKGROUND OF THE INVENTION

Disposable refuse bags have typically involved the use of 3-mil polyethylene films which are formed into bags and provided on rolls for use in the containment or collection of lightweight refuse, preferably refuse which does not have any sharp edges, points or other protuberances which could cause the bag to rip or tear. Moreover, such bags are limited in the weight of the contents to normally 20 to 25 pounds, which means that a large majority of the bag is unfilled and therefore unused.

When such bags are used on construction sites for containing, for instance, bricks, drywall pieces, two-by-fours with our without nails protruding therefrom, slate, tree limbs, cable, masonry, shingles, insulation, pipe, wire, gravel, metal or glass shards, typically these bags fail by either stretching and rupture due to the weight of the contents within the bag when the bag is lifted; or due to the puncturing, slicing or piercing of the bag film which has very little shear resistance. In such cases that the puncture or hole produced propagates rapidly to cause the contents of the bags to spill out through the rip or unintended opening of the bag.

Typically for construction sites, in the past, rubberized barrels were utilized to contain the refuse that existed at the site. However, these barrels are both expensive and are subject to theft. Moreover, the barrels themselves take up a considerable amount of space and are relatively heavy in and of themselves. The amount of rubber necessary to form such barrels causes such barrels to weigh, for instance, ten pounds without being filled. Also, these barrels, due to their cost, are not throwaway items and must be stored when not in use.

Though the barrels themselves may be nested to reduce the amount of storage space, when these barrels are nested they oftentimes stick to each other and are difficult to dislodge.

The result for one cleaning up a jobsite is either to use the expensive, large barrels or to utilize polyethylene continuous film bags, both of which are unsatisfactory for the above reasons.

SUMMARY OF INVENTION

Rather than utilizing non-throwaway barrels and rather than utilizing film bags, in the subject invention a high strength bag suitable for carting away demolition products such as bricks, wood, nails, and glass is comprised of a woven ribbon structure in which the woven material, rather than being a cord or strand, is a ribbon of polypropylene.

It has been found that, when bags are constructed utilizing the woven ribbon structure, the bags will safely contain refuse weighing in excess of 125 pounds for 40"×29" bags. It has also been found that any piercing of the woven structure does not creep or otherwise travel due to the woven nature of the bag, making the bag both tear resistant and cut resistant, while at the same time providing a tear strength or modulus which is quite high and in one embodiment is 35 warp pounds. or 32 filling pounds according to ASTM 5587.

While such a ribbon-woven structure does in fact stretch, it has been found that the bag does not rupture with loading so that the bag may be utilized to contain large amounts of refuse without fear of the bag breaking or failing.

In one embodiment, the bag is made by melting polypropylene pellets, extruding a web that is relatively flat, and then cutting the web longitudinally to make ribbons. These ribbons are then wound up on spools, with the spooled ribbons then feeding a loom or weaving machine such that an under/over weave is produced in which the flat ribbons are clearly visible to the naked eye.

In one embodiment, the polypropylene ribbons are three to six millimeters wide, a millimeter thick and are woven in an over and under pattern having a stitch count of 100 per inch.

While the weave can be made tight enough to prevent small objects from exiting the bag, in one embodiment a liquid-tight bag is provided by laminating a polypropylene film to the outer surfaces of the ribbon-woven bag. The polypropylene film is heat sealed to the web in a laminating process involving placing sheets about the exterior of the bag and laminating them to the outer surfaces of the bag through a heat/temperature cycle. Thereafter the bag with the laminate is cooled in a water bath.

In both the laminated and the non-laminated bag configurations, the structure is woven cylindrical, after which it is flattened. In order to manufacture each of the individual bags, the cylindrical flattened structure is severed along a transverse cut line and the bag is folded back on itself at the cut and stitched so as to form the bottom of the bag. The unsevered portion of the bag serves as the top or open portion of the bag.

In one example, bags of 40"×29" weigh only 85 grams, which make the bags of light enough weight to be folded and packaged in a convenient manner to be opened at the jobsite.

The bags are intended to be throwaway and packaged folded so that there is no problem of having to provide and store bulky containers.

The ASTM ratings of the bag are set forth in the table below:

TABLE I

| Fabric Variable | Test Result | Test Method |
|---|---|---|
| End/Inch | 10 | ASTM D3775 |
| Pick/Inch | 5 | ASTM D3775 |
| Fabric thickness mil | 4 | ASTM D1777 |
| Mass/Unit Area oz/yd$^2$ | 2.2 | ASTM D3776 |
| Grab Strength | | |
| Warp lb. | 121 | ASTM D5034 |
| Filling lb. | 98 | ASTM D5034 |
| Grab Elongation | | |
| Warp % | 20 | ASTM D5034 |
| Filling % | 20 | ASTM D5034 |
| Trapezoid Tear Strength | | |
| Warp lb. | 39 | ASTM D5587 |
| Filling lb. | 32 | ASTM D5587 |
| Burst Strength psi | 141 | ASTM D3786 |
| As Received | | |
| With 16 penny nail hole | 100 | ASTM D3786 |
| With 0.25" spike hole | 80 | ASTM D3786 |

Analysis: Samples were conditioned and tested in the Standard Atmosphere for Testing Textiles.

Due to the cut resistance, piercing resistance, tear resistance and stretch resistance of the polypropylene ribbon-woven bag, bags of the above dimensions are rated to hold upwards of 110 pounds or more of refuse. This means that the bags of the above dimensions may be filled to the top without fear of the bag ripping apart when the bag laden with refuse is transported from one position to another.

It has been found that the bags are so tough that construction site refuse may be loaded into the bags without fear of the bags ripping or tearing due to any of the contents within the bag.

The use of polypropylene ribbons takes advantage of the physical strength of the polypropylene resin when molded and cut into ribbons, with the width of the 1-2 millimeter-thick ribbons being variable from six millimeters down to three millimeters.

While the subject invention is described as utilizing polypropylene ribbons, other high strength materials may be utilized for the bag so that the bag may be ribbon-woven from a wide variety of materials, depending on the application. However, it should be noted that polypropylene is a relatively inexpensive material that has the above-noted ASTM properties. The result is that an ultra-strong bag can be fabricated with ribbon-weaving techniques that can be manufactured inexpensively enough for the bag to be a one-time use bag and then thrown out.

In summary, an ultra-strong tear resistant, cut resistant, puncture resistant bag having a high shear strength or modulus is provided by weaving ribbons of flat polypropylene sheet into a bag. The bag is formed by weaving a cylindrically shaped object, cutting the object transversely and sealing up one end to form the bag. The physical properties of the ribbon-woven bag easily accommodate holding refuse including bricks, wood with nails, glass and other refuse in a lightweight disposable bag. In an alternative embodiment, the ribbon-woven bag is overlain with sheets laminated to the exterior of the bag to provide a fluid-tight container.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
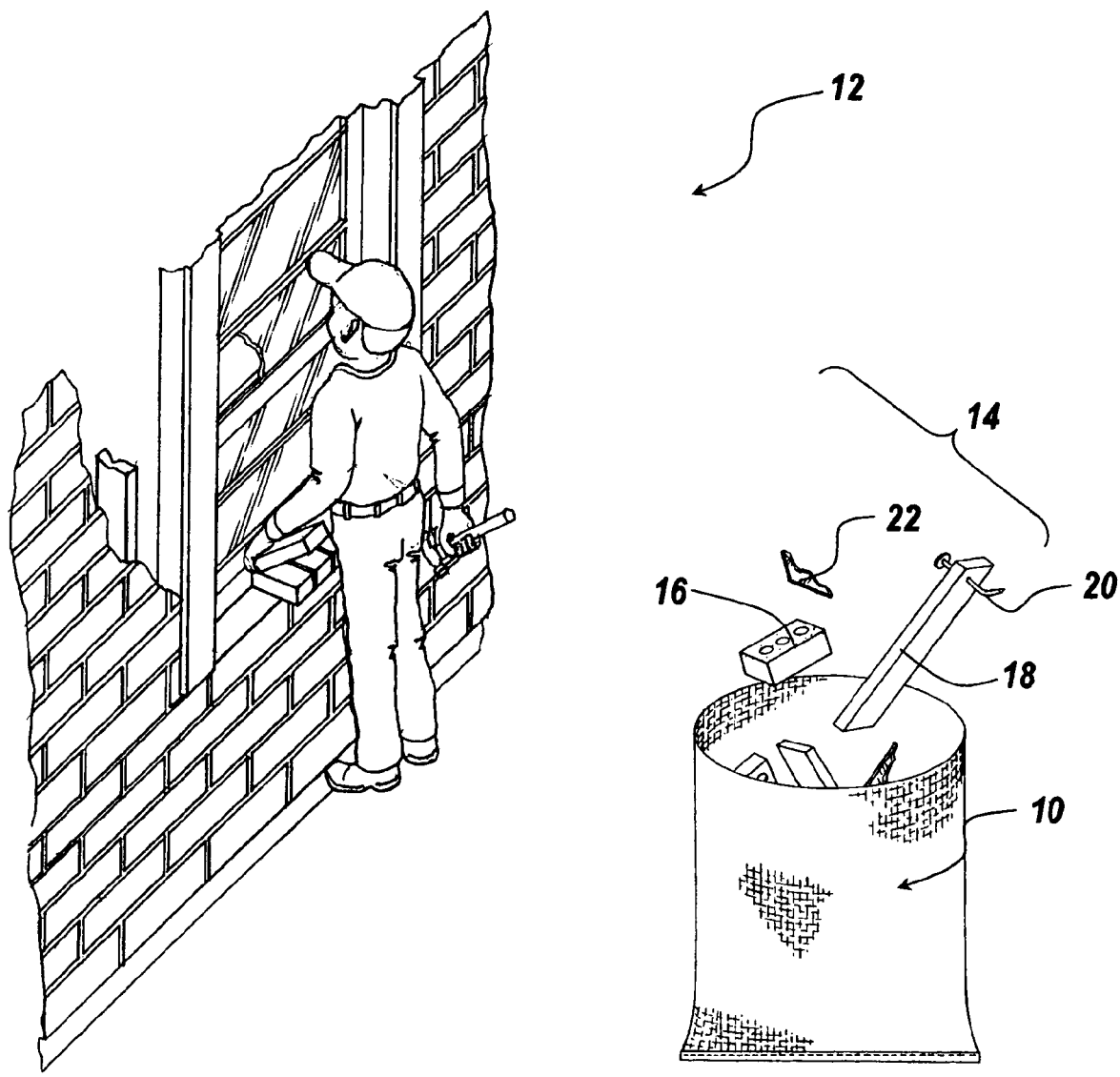
FIG. 1 is a diagrammatic illustration of the utilization of the subject ribbon-woven bag for containing refuse at a construction site.

Referring now to FIG. 1, a ribbon-woven bag 10 is opened at a construction site 12 so that refuse, generally indicated at 14, may be placed within the bag. The refuse may contain heavy, sharp-cornered bricks 16, wooden two-by-fours 18 having nails 20 protruding therethrough or may include shards 22 of glass, all of which is placed within the bag 10 for transport off-site.

It will be appreciated that the sharp corners of the brick would ordinarily pierce a polyethylene film bag, as would the points of nail 20 or any other sharp hardware that happens to be contained within the bag.

However, it has been found that with a ribbon-woven polypropylene bag structure, all of the refuse at a typical jobsite can be contained safely within a bag formed with the ribbon weaving so that the bag can be a one-use bag which is provided folded up at the jobsite and then opened and filled. Once filled, the bag is capable of being lifted by its top and transported to a refuse disposal location.

Figure 2:
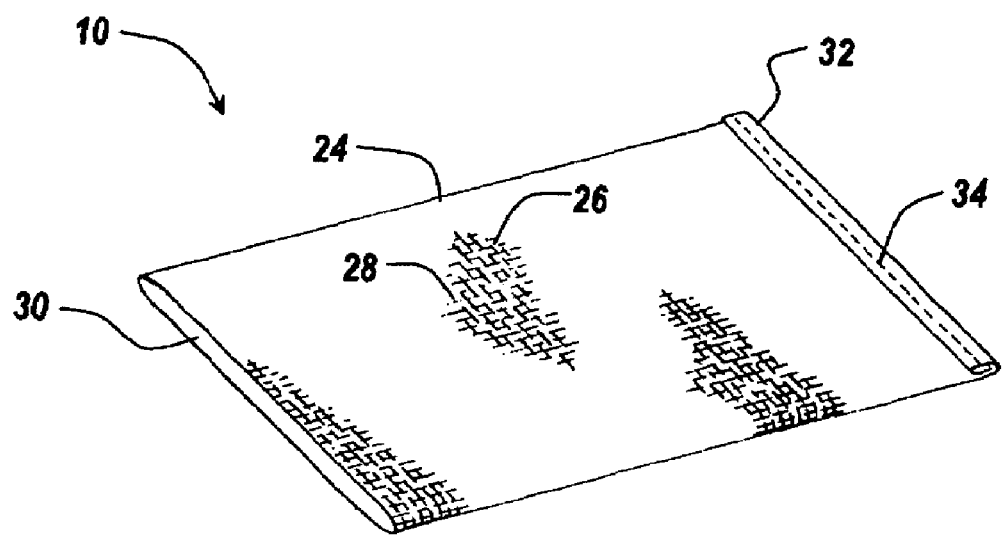
FIG. 2 is a diagrammatic illustration of a ribbon-woven bag, illustrating the relatively wide ribbon-woven elements, with the end of the bag being folded back upwardly and stitched to the bag to form its bottom.

Referring to FIG. 2, bag 10 has a side 24 comprised of woven ribbons 26 running longitudinally and ribbons 28 running laterally. Bag 10 is provided with a mouth 30 which is open, with an end 32 being folded upon itself as illustrated and stitched at the bottom of the bag via stitching 34 to complete the bag.

As mentioned above, the ribbon-woven bag is made from polypropylene, with an 85-gram bag 40"×29" inches passing the ASTM tests listed in Table I above.

While the bag of FIG. 2 is woven, it is not necessarily liquid tight. In order to make the bag of FIG. 2 liquid tight and referring now to FIG. 3, bag 10 is provided with an overlying laminated sheet or film 36, which is laminated to the outer surface of the bag when the bag is flat. It has been found that such a laminated film or sheet can be easily affixed to the ribbon-woven polypropylene on the outside such that it will stay in place and hold any liquid within the bag. Note that the physical properties of the underlying bag prevents the bag contents from spilling out due to the weight thereof, or sharp protrusions or edges of the bag contents.

It will be appreciated that by placing the liquid-tight film over the outer surface of the bag, the bag itself provides for the load-bearing structure, with the outer film containing any liquids in the bag.

Figure 3:
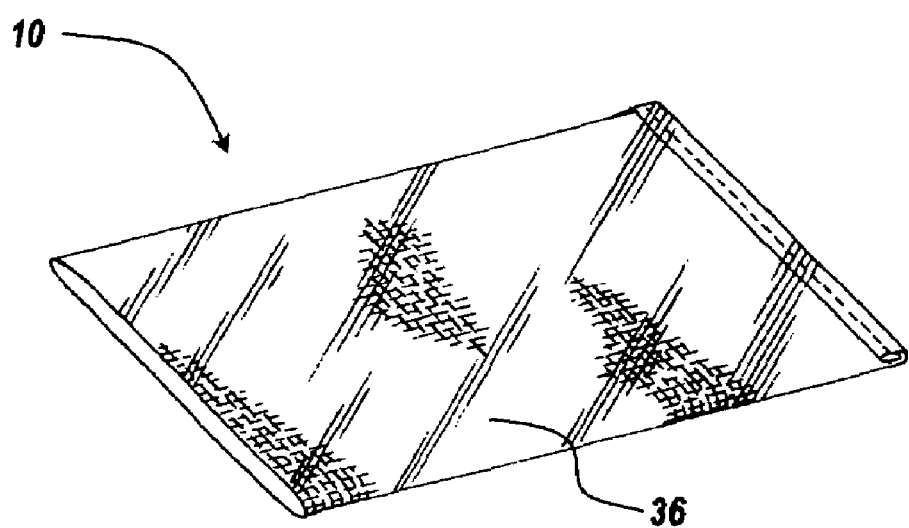
FIG. 3 is a diagrammatic illustration of the bag of FIG. 2, provided with a laminated polypropylene sheet or film to provide a liquid-impervious outer layer for the bag.
Figure 4:
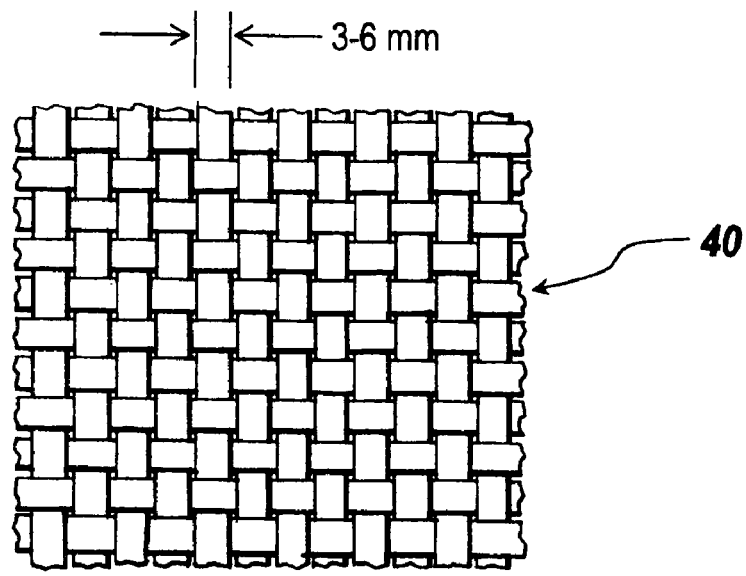
FIG. 4 is an exploded view of a portion of the bag of FIG. 2, showing the ribbon-woven structure of the bag.

Referring to FIG. 4, a portion 40 of the ribbon weave for the bags of FIGS. 2 and 3 is shown in which, in a preferred embodiment, the width of the ribbons is between three and six millimeters.

It will be appreciated that the tighter the weave, meaning the less wide the ribbon, the greater will be the physical strength characteristics of the bag. It has, however, been shown that the characteristics shown by the ASTM Table I can be achieved through the utilization of six-millimeter-wide ribbons to make up the bag. The utilization of the wider ribbons means that less weaving is involved and therefore the bag may be made lighter than with the tighter weave.

Figure 5:
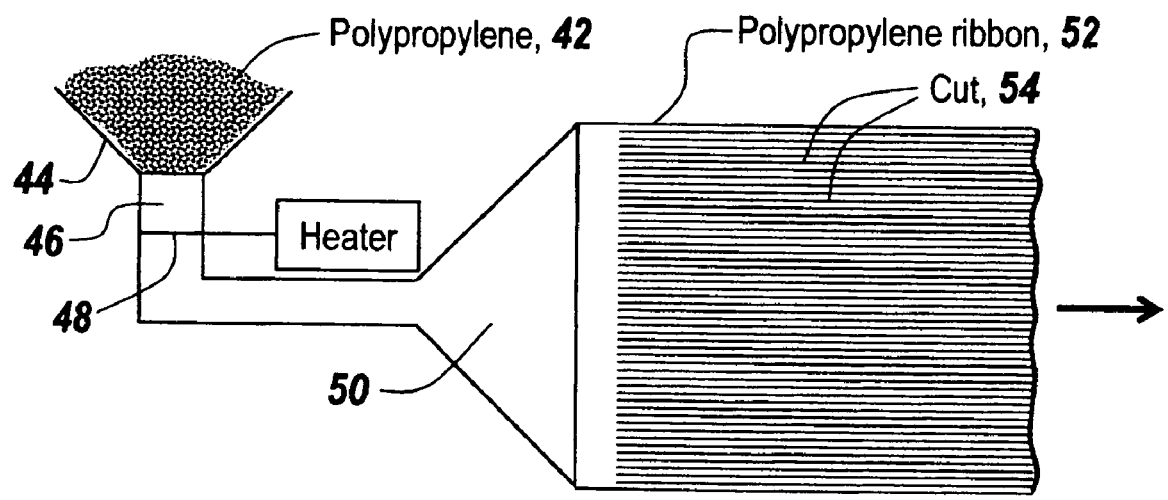
FIG. 5 is a diagrammatic illustration of the formation of polypropylene ribbons, which are extruded in a flat sheet and then longitudinally cut.

Referring to FIG. 5, in one embodiment the ribbons are made by placing polypropylene pellets 42 in a hopper 44 having an exit throat 46 which is heated at 48 to liquefy the polypropylene pellets.

The resultant liquid plastic is forced through a nozzle 50 which provides a flat sheet 52 of polypropylene. The sheet is then skived or slit as illustrated by cuts 54 in a longitudinal direction to form separate ribbons of polypropylene. The ribbons are then spooled and provided to a loom or weaving machine such as that shown in FIG. 6.

Figure 6:
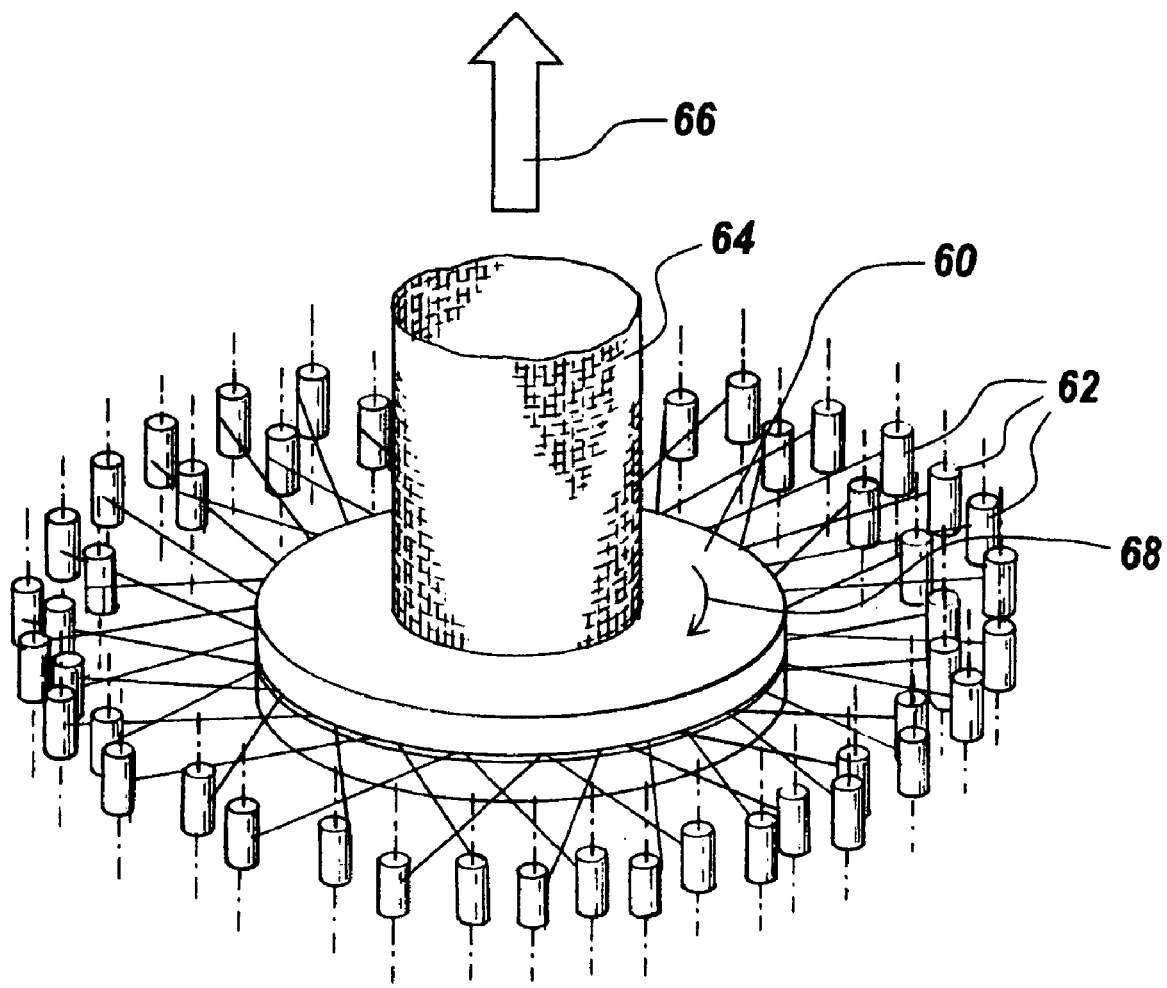
FIG. 6 is a diagrammatic illustration of a ribbon weaving machine or loom showing the utilization of polypropylene ribbons which are woven into a cylinder; and, FIG. 7 is a diagrammatic illustration of the lamination of a polypropylene film over an already-formed cylindrical flattened bag structure, illustrating the lamination of the film to the outer surfaces of the bag and then the provision of a cooling bath, after which the structure is cut, folded over at one end, and stitched at this end.

Referring now to FIG. 6, the weaving machine is one available from Barmag Models FB1200-FB2000. Here the weaving machine includes a rotatable slotted capstan containing ribbon carriers which takes ribbon from rolls 62 spaced about the periphery of the capstan. The resultant cylindrical weave 64 exits upwardly as illustrated by arrow 66, with the capstan 60 rotating as illustrated by arrow 68.

The result is the subject ribbon-woven cylindrical bag structure, which is processed by cutting and stitching to form individual bags.

Referring to FIG. 7, in one embodiment the cylindrical ribbon-woven structure 70 is passed between two rollers 72 and 74, each containing a film of polypropylene that is applied by heated platens 76 to either side of the flattened cylindrical bag structure. After heating the polypropylene for lamination purposes, such as at 280° C. for a period of time controlled by the length of the heating platen and the speed with which the bag is drawn through the platens, it is then subjected to a cooling bath 78 at which point the flattened cylindrical bag structure with laminates on top and bottom is cut as illustrated at 80. The cut bag is folded over at one end as illustrated at 82 and is stitched at 84 so as to complete the bag. Note that for laminating a Starlinger Model 20 laminating machine may be used.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An ultra strong, tear-resistant, puncture-resistant bag having a high tear strength, comprising:
    a ribbon-woven bag having crossed woven ribbons of flat polypropylene sheet devoid of low melting temperature bonding layers between the crossed ribbons, said bag formed in a cylinder and stitched at one end to complete the bag, wherein the stitch count for said bag is 100 per inch.

2. The bag of claim 1, wherein the width of said ribbons is between 3 and 6 millimeters.

3. The bag of claim 2, wherein said ribbons have a 4-millimeter thickness.

4. The bag of claim 2, wherein the Mass/Unit Area in oz/yd$^2$ of said bag is 2.2.

5. The bag of claim 2, wherein the grab strength of said bag in warp pounds is 121.

6. The bag of claim 2, wherein the grab strength of said bag in filling pounds is 98.

7. The bag of claim 2, wherein the trapezoidal tear strength of said bag in warp pounds is 39.

8. The bag of claim 2, wherein the trapezoidal tear strength in filling pounds of said bag is 32.

9. The bag of claim 2, wherein the burst strength in psi of said bag is 141.

10. The bag of claim 2, wherein the burst strength in psi of said bag with a 16-penny nail hole is 100.

11. The bag of claim 2, wherein the burst strength in psi of said bag with a 0.25" spike hole is 80.

12. The bag of claim 2, wherein said bag further includes a liquid-tight layer laminated thereto.

13. The bag of claim 12, wherein said liquid-tight layer is laminated to the exterior of said bag.

14. The bag of claim 12, wherein said liquid-tight layer includes a sheet of polypropylene film.

15. The bag of claim 14, wherein said polypropylene film is heat-sealed to said bag.

16. The bag of claim 1, wherein said bag measures 40" by 29" and weighs less than 85 grams.

17. A method of removing refuse having sharp points or edges in an economical fashion, comprising the step of locating the refuse in a disposable ribbon-woven polypropylene bag devoid of bonding layers between the ribbon crossovers, the bonding layers having a melting point lower than that of the ribbon, the bag formed in a cylinder and stitched at one end to complete the bag, the bag having sufficient tear resistance, burst resistance and light enough weight to successfully retain the refuse without failure, wherein the stitch count for said bag is 100 per inch.

18. The method of claim 17, wherein the bag is made of polypropylene ribbons of 3 millimeters to 6 millimeters.

19. The method of claim 18, wherein the thickness of the ribbons is 4 millimeters.

20. The method of claim 18, wherein the Mass/Unit Area in oz/yd$^2$ is 2.2.

* * * * *